(12) United States Patent
Maeagawa

(10) Patent No.: US 8,305,045 B2
(45) Date of Patent: Nov. 6, 2012

(54) CHARGE CONTROL CIRCUIT, BATTERY PACK, AND CHARGING SYSTEM

(75) Inventor: Kazuya Maeagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/375,739

(22) PCT Filed: Nov. 8, 2010

(86) PCT No.: PCT/JP2010/006541
§ 371 (c)(1),
(2), (4) Date: Dec. 1, 2011

(87) PCT Pub. No.: WO2011/061902
PCT Pub. Date: May 26, 2011

(65) Prior Publication Data
US 2012/0086406 A1    Apr. 12, 2012

(30) Foreign Application Priority Data
Nov. 20, 2009   (JP) .................................. 2009-264700

(51) Int. Cl.
*H02J 7/04* (2006.01)
*H02J 7/06* (2006.01)

(52) U.S. Cl. ........ 320/162; 320/139; 320/141; 320/148; 320/164

(58) Field of Classification Search ................... 320/162, 320/164, 148
See application file for complete search history.

(56) References Cited

U.S. PATENT DOCUMENTS

| | | | | |
|---|---|---|---|---|
| 5,442,274 A | * | 8/1995 | Tamai | 320/146 |
| 5,589,755 A | * | 12/1996 | Kaite et al. | 320/160 |
| 6,028,415 A | * | 2/2000 | Nagai et al. | 320/162 |
| 6,087,810 A | | 7/2000 | Yoshida | |
| 7,274,171 B2 | * | 9/2007 | Nishida et al. | 320/137 |
| 2005/0194938 A1 | | 9/2005 | Sanpei | |
| 2009/0273320 A1 | * | 11/2009 | Ungar et al. | 320/162 |
| 2011/0012563 A1 | | 1/2011 | Paryani et al. | |

FOREIGN PATENT DOCUMENTS

| | | |
|---|---|---|
| EP | 1 571 747 A1 | 9/2005 |
| EP | 2 276 139 A2 | 1/2011 |
| JP | 9-121462 | 5/1997 |
| JP | 2005-253210 | 9/2005 |
| JP | 2007-151261 | 6/2007 |
| JP | 2009-033843 | 2/2009 |
| JP | 2011-024412 | 2/2011 |
| WO | WO 97/15977 | 5/1997 |

* cited by examiner

Primary Examiner — M'Baye Diao
(74) Attorney, Agent, or Firm — McDermott Will & Emery LLP

(57) ABSTRACT

A charge control circuit having a charge controller, a voltage detector, and a current detector is provided. The charge controller repeats the constant current constant voltage charge a plurality of times. In doing so, the charge controller supplies a charging current of a predetermined set current value from the charger to the secondary battery. This causes the charger to execute constant current charge when the terminal voltage detected by the voltage detector becomes equal to a predetermined threshold voltage value during the execution of the constant current charge. In turn, the charger executes a constant voltage charge by supplying a charging voltage of the threshold voltage value from the charger to the secondary battery until a current value detected by the current detector becomes equal to a predetermined threshold current value.

6 Claims, 5 Drawing Sheets

| STAGE | TERMINAL VOLTAGE Vb | SET CURRENT VALUE Is | THRESHOLD VOLTAGE VALUE Vth | THRESHOLD CURRENT VALUE Ith |
|---|---|---|---|---|
| 1 | Vb<V1 | I1 | V1 | I0 |
| 2 | V1≦Vb<V2 | I4 | V2 | I3 |
| 3 | V2≦Vb<V3 | I6 | V3 | I5 |
| 4 | V3≦Vb<V4 | I5 | V4 | I2 |
| 5 | V4≦Vb<Vf | I2 | Vf | If |

Some image description

CHARGE CONTROL CIRCUIT, BATTERY PACK, AND CHARGING SYSTEM

RELATED APPLICATIONS

This application is the U.S. National Phase under 35 U.S.C. §371 of International Application No. PCT/JP2010/006541, filed on Nov. 8, 2010, which in turn claims the benefit of Japanese Application No. 2009-264700, filed on Nov. 20, 2009, the disclosures of which Applications are incorporated by reference herein.

TECHNICAL FIELD

The present invention relates to a charge control circuit for controlling charging of a secondary battery, as well as to a battery pack and a charging system that have this charge control circuit.

BACKGROUND ART

There has conventionally been known a pulse charging system for charging a secondary battery for a short period of time with an application of a pulsed constant current (see, for example, Patent Document 1). Such pulse charging system is so designed as to reduce the charging time for a secondary battery by charging the secondary battery at a charging voltage above a full charge voltage and with a large current in a short period of time during which the pulsed current flows.

There has been also known a multi-stage constant current charging system that gradually reduces the level of a charging current for constant current charge with multiple stages (see, for example, Patent Document 2). This multi-stage constant current charging system requires less charging current in the last charging state and is capable of preventing the rise of a battery temperature, which, in turn, prevents the degradation of a secondary battery.

In the pulse charging system described above, however, a terminal voltage of the secondary battery exceeds the full charge voltage as soon as a charging pulse is applied to the nearly fully charged secondary battery, degrading the secondary battery.

In the multi-stage constant current charging system, on the other hand, unlike the pulse charging system, a voltage exceeding the full charge voltage is not applied intentionally to the secondary battery, thus preventing the degradation of the secondary battery more effectively than the pulse charging system. However, the charging time is longer in the multi-stage constant current charging system than the pulse charging system.

CITATION LIST

Patent Literature

Patent Document 1: Japanese Patent Application Publication No. 2005-253210
Patent Document 2: Japanese Patent Application Publication No. 2007-151261

SUMMARY OF THE INVENTION

An object of the present invention is to provide a charge control circuit, which is capable of preventing the degradation of a secondary battery more effectively than the pulse charging system and reducing the charging time more easily than the multi-stage constant current charging system according to the background art, as well as a battery pack and a charging system that use this charge control circuit.

A charge control circuit according to one aspect of the present invention has: a charge controller for controlling an operation of a charger that charges a secondary battery; a voltage detector for detecting a terminal voltage of the secondary battery; and a current detector for detecting a current flowing to the secondary battery, wherein the charge controller repeats a plurality of times constant current constant voltage charge in which the charge controller supplies a charging current of a predetermined set current value from the charger to the secondary battery to cause the charger to execute constant current charge, and, when the terminal voltage detected by the voltage detector becomes equal to a predetermined threshold voltage value during the execution of the constant current charge, causes the charger to execute constant voltage charge by supplying a charging voltage of the threshold voltage value from the charger to the secondary battery until a current value detected by the current detector becomes equal to a predetermined threshold current value, and increases the threshold voltage value and reduces the set current value and the threshold current value each time the constant current constant voltage charge is repeated.

DESCRIPTION OF EMBODIMENTS

Figure 1:
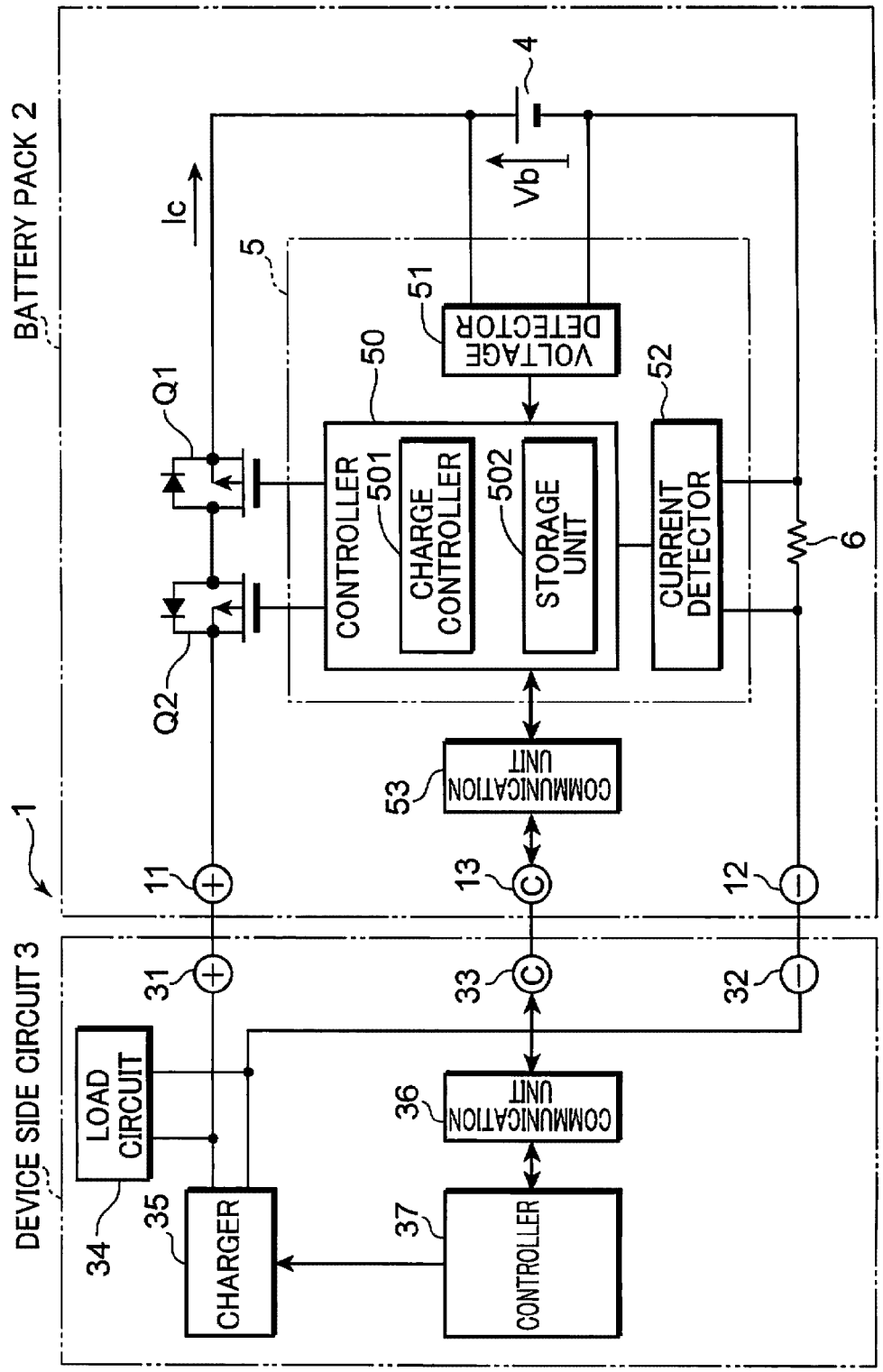
FIG. 1 is a block diagram showing an example of configurations of a battery pack and a charging system that have a charge control circuit according to an embodiment of the present invention.

Embodiments of the present invention are described hereinafter with reference to the drawings. Note that the components shown in the diagrams are denoted with the same reference numerals to indicate the same components, and, thus, the descriptions thereof are omitted. FIG. 1 is a block diagram showing an example of configurations of a battery pack 2 and charging system 1 that have a charge control circuit 5 according to an embodiment of the present invention. The charging system 1 shown in FIG. 1 is constituted by a combination of the battery pack 2 and a device side circuit 3.

The charging system 1 is a battery-equipped device system, such as a portable personal computer, digital camera, a mobile phone and other electronic devices, or a vehicle such as an electric vehicle and hybrid car. The device side circuit 3 constitutes, for example, a main part of the battery-equipped device system, and a load circuit 34 is operated by supply of electric power from the battery pack 2 in this battery-equipped device system.

The battery pack 2 has a secondary battery 4, a charge control circuit 5, a current detection resistor 6, switching elements Q1, Q2, and connecting terminals 11, 12, 13. The battery pack 2 can be attached to and detached from the device side circuit 3. The charge control circuit 5 has a controller 50, a voltage detector 51, a current detector 52, and a communication unit 53.

Note that the configuration of the charging system 1 is not necessarily limited to the one in which the battery pack 2 and the device side circuit 3 can be separated from each other. The entire charging system 1 may constitute a single charge control circuit 5. Or, the charging system 1 may have a configuration in which the charge control circuit 5 is shared by the battery pack 2 and the device side circuit 3. Furthermore, the secondary battery 4 is not necessarily in the form of a battery pack, and, for example, the charge control circuit 5 may be configured as an in-vehicle ECU (Electronic Control Unit).

The device side circuit 3 has connecting terminals 31, 32, 33, the load circuit 34, a charger 35, a communication unit 36, and a controller 37. The charger 35 is connected to the connecting terminals 31, 32 for feeding electric power, and the communication unit 36 is connected to the connecting terminal 33.

Once the battery pack 2 is installed in the device side circuit 3, the connecting terminals 11, 12, 13 of the battery pack 2 are connected to the connecting terminals 31, 32, 33 of the device side circuit 3 respectively.

The communication units 53, 36 are communication interface circuits that are capable of exchanging data with each other via the connecting terminals 13, 33.

The charger 35 is a power supply circuit that supplies currents and voltages corresponding to control signals from the controller 37, via the connecting terminals 31, 32, to the battery pack 2. The charger 35 may be a power supply circuit that generates a charging current for the battery pack 2 out of, for example, a commercial source voltage, or may be a generator that generates electricity based on the natural energies such as solar power, wind power and water power, or a generator that generates electricity by the power of an internal combustion engine or the like.

The controller 37 is a control circuit configured by, for example, a microcomputer. When the communication unit 36 receives a request instruction transmitted from the controller 50 of the battery pack 2 by the communication unit 53, the controller 37 outputs a current or voltage that corresponds to the request instruction transmitted from the battery pack 2, from the charger 35 to the connecting terminals 11, 12, by controlling the charger 35 in accordance with the request instruction received by the communication unit 36.

In the battery pack 2, the connecting terminal 11 is connected to a positive electrode of the secondary battery 4 by the switching element Q2 and the switching element Q1. P-channel FETs (field effect transistors), for example, are used as the switching element Q1 and the switching element Q2.

Each of the switching elements Q1, Q2 has a parasitic diode. The parasitic diode of the switching element Q2 is disposed in a manner that a discharging current of the secondary battery 4 flows in a forward direction (a direction from the positive electrode of the secondary battery 4 toward the connecting terminal 11). Accordingly, by being turned off, the switching element Q2 shuts down only the current that flows in a charging direction of the secondary battery 4 (a direction from the connecting terminal 11 toward the positive electrode of the secondary battery 4).

On the other hand, the parasitic diode of the switching element Q1 is disposed in a manner that a charging current of the secondary battery 4 flows in the forward direction. Accordingly, by being turned off, the switching element Q1 shuts down only the current that flows in a discharging direction of the secondary battery 4. The switching elements Q1, Q2 are normally ON. However, the switching elements Q1, Q2 are turned off in the case of abnormality, in order to protect the secondary battery 4.

The connecting terminal 12 is connected to a negative electrode of the secondary battery 4 by the current detection resistor 6. A current path in the battery pack 2, therefore, extends from the connecting terminal 11 to the connecting terminal 12 through the switching element Q2, the switching element Q1, the secondary battery 4, and then the current detection resistor 6.

Note that the connecting terminals 11, 12, 13, 31, 32, 33 may have any configurations as long as these connecting terminals establish an electrical connection between the battery pack 2 and the device side circuit 3. Therefore, the connecting terminals 11, 12, 13, 31, 32, 33 may not only be, for example, electrodes, connectors, or terminal blocks, but also have a wiring pattern in the form of a land or a pad.

The current detection resistor 6, a shunt resistance used for detecting a current, converts the charging current and the discharging current of the secondary battery 4 into voltage values. Note that a current transformer or a current detection element such as a hall element may be used in plate of the current detection resistor 6.

The secondary battery 4 may be, for example, an electric cell, or an assembled battery in which a plurality of secondary batteries are connected in series. In addition, the secondary battery 4 may be, for example, an assembled battery in which a plurality of secondary batteries are connected in parallel, or an assembled battery in which a plurality of secondary batteries are connected in series and parallel. A lithium-ion secondary battery, for example, is used as the secondary battery 4. Note that the secondary battery 4 may not only be a lithium-ion secondary battery; for example, nickel-hydrogen secondary battery, nickel-cadmium secondary battery, or various other secondary batteries can be used as the secondary battery 4.

When a terminal voltage Vb is extremely low, internal short-circuit might occur in the secondary battery 4. For instance, in the case of a lithium-ion secondary battery, when the terminal voltage of one cell is approximately 1.4 V or lower, lithium deposition occurs in the battery, causing internal short-circuit. Therefore, when the secondary battery 4 is an electric cell and the terminal voltage Vb thereof becomes approximately 1.4 V or lower, internal short-circuit might occur in the battery. In the case in which the secondary battery 4 is an assembled battery having n cells connected in series, when the terminal voltage Vb thereof becomes approximately 1.4 V×n or lower, internal short-circuit might occur in the battery. For this reason, a voltage at which internal short-circuit might occur in the secondary battery 4 is set as a determination voltage Vj in advance.

The voltage detector 51, which is constituted by an analog-digital converter, for example, detects the terminal voltage of the secondary battery 4 (inter-terminal voltage) and outputs a signal indicating the terminal voltage to the controller 50.

The current detector 52 is constituted by, for example, an analog-digital converter. The current detector 52 detects a voltage Vr between both ends of the current detection resistor 6, and outputs a signal indicating the voltage Vr to the controller 50 as a information indicating a charging current value Ic of a charging current flowing to the secondary battery 4. The current detector 52 expresses the direction of charging the secondary battery 4 using a positive value and the direction of charging the secondary battery 4 using a negative value in terms of the information (voltage Vr) indicating the charging current value Ic.

The controller 50 acquires the charging current value Ic of the charging current flowing to the secondary battery 4, by, for example, dividing the voltage Vr by a resistance value R of the current detection resistor 6.

The controller 50 is constituted by, for example, a CPU (Central Processing Unit) for executing a predetermined arithmetic process, a ROM (Read Only Memory) in which a predetermined control program is stored, a RAM (Random Access Memory) for temporarily storing data, a storage unit 502 constituted by, for example, a ROM, and peripheral circuits around these elements.

The controller 50 functions as a charge controller 501 by executing the control program stored in the ROM.

The charge controller 501 uses the communication units 53, 36 to transmit the request instruction on a charging current corresponding to a set current value Is, to the controller 37. Consequently, the charging current corresponding to the set current value Is is supplied from the charger 35 to the secondary battery 4 according to the control performed by the controller 37, whereby constant current charge is executed. When the terminal voltage Vb of the secondary battery 4 detected by the voltage detector 51 reaches a predetermined threshold voltage value Vth, the charge controller 501 uses the communication units 53, 36 to transmit the request instruction on the charging voltage equivalent to the threshold voltage value Vth, to the controller 37. Consequently, the charging voltage equivalent to the threshold voltage value Vth is supplied from the charger 35 to the secondary battery 4 according to the control performed by the controller 37, whereby constant voltage charge is executed. In this manner, the charge controller 501 executes the constant voltage charge until the charging currant value Ic detected by the current detector 52 becomes a threshold current value Ith. Such combination of the constant current charge and the constant voltage charge allows the charge controller 501 to execute constant current constant voltage (CCCV) charge.

Furthermore, when performing the constant current constant voltage charge (CCCV charging), which is started when the terminal voltage Vb detected by the voltage detector 51 exceeds the predefined determination voltage Vj, the charge controller 501 refers to the data table A stored in the storage unit 502 to fully charge the secondary battery 4 by repeating the constant current constant voltage charge a plurality of times while stepwise increasing the threshold voltage value Vth to a full charge voltage Vf of the secondary battery 4 and stepwise reducing the threshold current value Ith to a determination current value If used for determining to fully charge the secondary battery 4.

On the other hand, when performing the constant current constant voltage charge, which is repeated subsequent to the constant current constant voltage charge that is started when the terminal voltage Vb detected by the voltage detector 51 is less than the determination voltage Vj, the charge controller 501 stepwise increases the threshold voltage value Vth and the threshold current value Ith to values higher than those obtained in the previous constant current constant voltage charge, based on the data table A stored in the storage unit 502.

Figure 2:
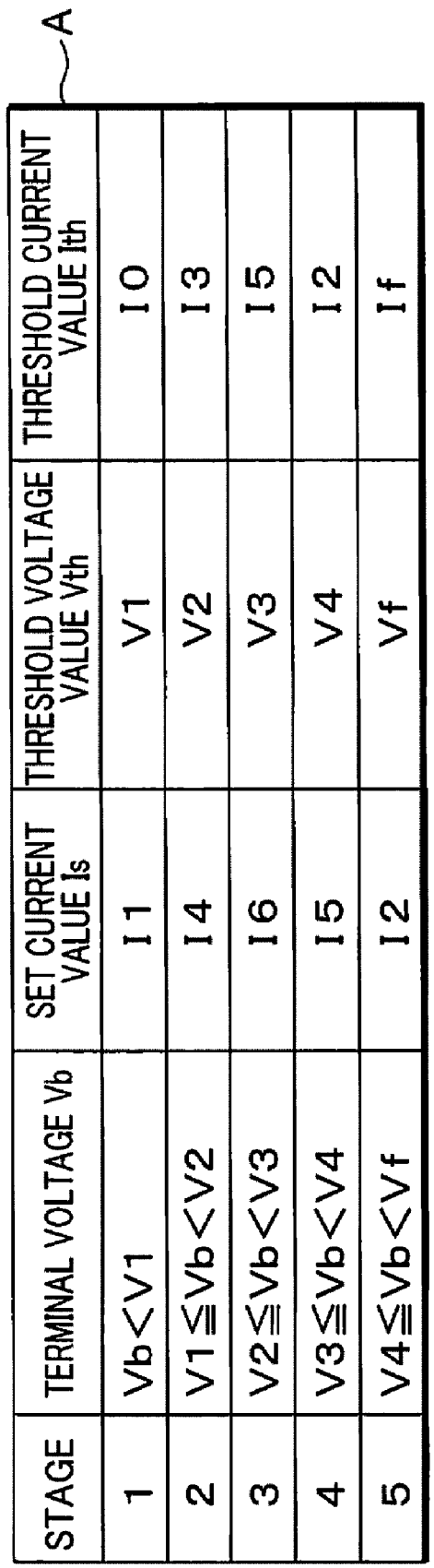
FIG. 2 is an explanatory diagram in the form of a table, illustrating an example of a data table that is stored in a storage unit shown in FIG. 1.

As shown in FIG. 2, for example, the storage unit 502 stores therein the data table A (LUT: Look-up Table) in which the set current value Is, the threshold voltage value Vth and the threshold current value Ith that are used for the constant current constant voltage charge performed by the charge controller 501 are related to the terminal voltage Vb.

In the data table A shown in FIG. 2, voltage values V1 to V4 and Vf are in a relation of V1<V2<V3<V4<Vf. The voltage value Vf is the full charge voltage for the secondary battery 4.

The data table A here illustrates an example in which the determination voltage Vj is in a relation of, for example, V1<Vj<V2. In addition, current values I0 to I6 and If are in a relation of If<I0<I1<I2<I3<I4<I5<I6. The current value If is the determination current value used for determining to fully charge the secondary battery 4.

The data table A shown in FIG. 2 divides a voltage range of the terminal voltage Vb from 0V to the full charge voltage Vf into five stages (regions) to store therein the set current value Is, the threshold voltage value Vth and the threshold current value Ith corresponding to each stage. A voltage that is equal to the threshold voltage value Vth corresponding to a stage in which the terminal voltage Vb is lower by one stage is set as a lower limit of the voltage range of the terminal voltage Vb corresponding to each stage. This allows the terminal voltage Vb to be shifted to a higher stage, one stage by one stage, each time the constant current constant voltage charge is executed.

Moreover, as shown in the data table A, in stages 1, 2 where the terminal voltage Vb is less than the determination voltage Vj, the set current value Is, the threshold current value Ith and the threshold voltage value Vth are set in a manner that these values increase when the terminal voltage Vb is shifted from the stages 1, 2 to the next stages 2, 3. The set current value Is (charging current value) in the stages 1, 2 where the terminal voltage Vb is less than the determination voltage Vj is set at an extremely small current value so as not to break or damage the battery pack 2 even if internal short-circuit occurs in the secondary battery 4.

Note that the determination voltage Vj may not necessarily be small enough to cause internal short-circuit in the secondary battery 4. For example, when the voltage at which internal short-circuit might occur in the secondary battery 4 is less than the voltage value V1, the determination voltage Vj may be set at, for example, a voltage within the voltage range satisfying the condition of V1<Vj<V2.

In this case, in the stage 2 where the terminal voltage Vb exceeds the voltage at which internal short-circuit is likely to occur in the secondary battery 4, the set current value Is (charging current value) is not necessarily a current value that might break or damage the battery pack 2, even when internal short-circuit occurs in the secondary battery 4. However, because the terminal voltage Vb is less than the determination voltage Vj in the stage 2, the set current value Is (charging current value) is set at a value smaller than that of the subsequent stage 3.

By setting the charging current value of the stage 2 at a current value smaller than that of the subsequent stage 3, the amount of heat generated by charging the secondary battery 4 can be reduced. The amount of heat generated by the secondary battery 4 can be adjusted by appropriately setting the determination voltage Vj, making the thermal design of the battery pack 2 simple.

On the other hand, as shown in the data table A, in stages 3, 4 where the terminal voltage Vb exceeds the determination voltage Vj, the set current value Is, the threshold current value Ith and the threshold voltage value Vth are set in a manner that the set current value Is and the threshold current value Ith decrease and the threshold voltage value Vth increase, when the terminal voltage Vb is shifted from the stages 3, 4 to the next stages 4, 5. In addition, the threshold current value Ith of the stages 3, 4 is set so as to be equal to the set current value Is of the subsequent stages 4, 5.

Here, when a current corresponding to the set current value Is flows to the secondary battery 4, the terminal voltage Vb is obtained by adding a voltage, which is generated as the current corresponding to the set current value Is flows to an internal resistance of the secondary battery 4, to an open circuit voltage (OCV) of the secondary battery 4. Therefore, the terminal voltage Vb and the open circuit voltage of the secondary battery 4 are not the same and the difference therebetween changes according to the charging current.

For this reason, in the case of performing the constant current charge with multiple stages, reducing the set current value Is and increasing the threshold voltage value Vth by subtracting or adding a fixed value so as to shift one stage creates the following problems. In other words, when the charging current is large, the difference between the terminal voltage Vb (charging voltage) and the open circuit voltage of the secondary battery 4 becomes large. Consequently, the terminal voltage Vb reaches the threshold voltage value Vth before the open circuit voltage increases sufficiently, ending the constant current charge. This increases the charging time. Because there is a small difference between the terminal voltage Vb (charging voltage) and the open circuit voltage of the secondary battery 4 when the charging current is small, when the terminal voltage Vb reaches the threshold voltage value Vth after setting the threshold voltage value Vth high in case where the charging current is large, the open circuit voltage becomes excessively high, facilitating the degradation of the secondary battery 4.

In view of this fact, the charge control circuit 5 shown in FIG. 1, for example, experimentally obtains a combination of the set current value Is and the threshold voltage value Vth that allows an execution of excellent charging (charging that does not end the constant current charge early and prevents the degradation of the secondary battery 4), instead of carrying out the arithmetic calculation such as subtracting or adding a fixed value in order to reduce the set current value Is and increase the threshold voltage value Vth, and then stores the obtained combination as the data table A in the storage unit 502.

Then, the set current value Is (charging current value) and the threshold voltage value Vth are set with respect to each stage (terminal voltage Vb) based on the data table A, so as to realize an optimal combination of the set current value Is and the threshold voltage value Vth, facilitating the execution of the excellent charging.

Note that the storage unit 502 is not always required. When the terminal voltage Vb is shifted by one stage in the case of performing the constant current charge with multiple stages, the charge controller 501 may reduce and increase the set current value Is and the thermal voltage value Vth without using the data table A but by means of the arithmetic calculation.

Figure 3:
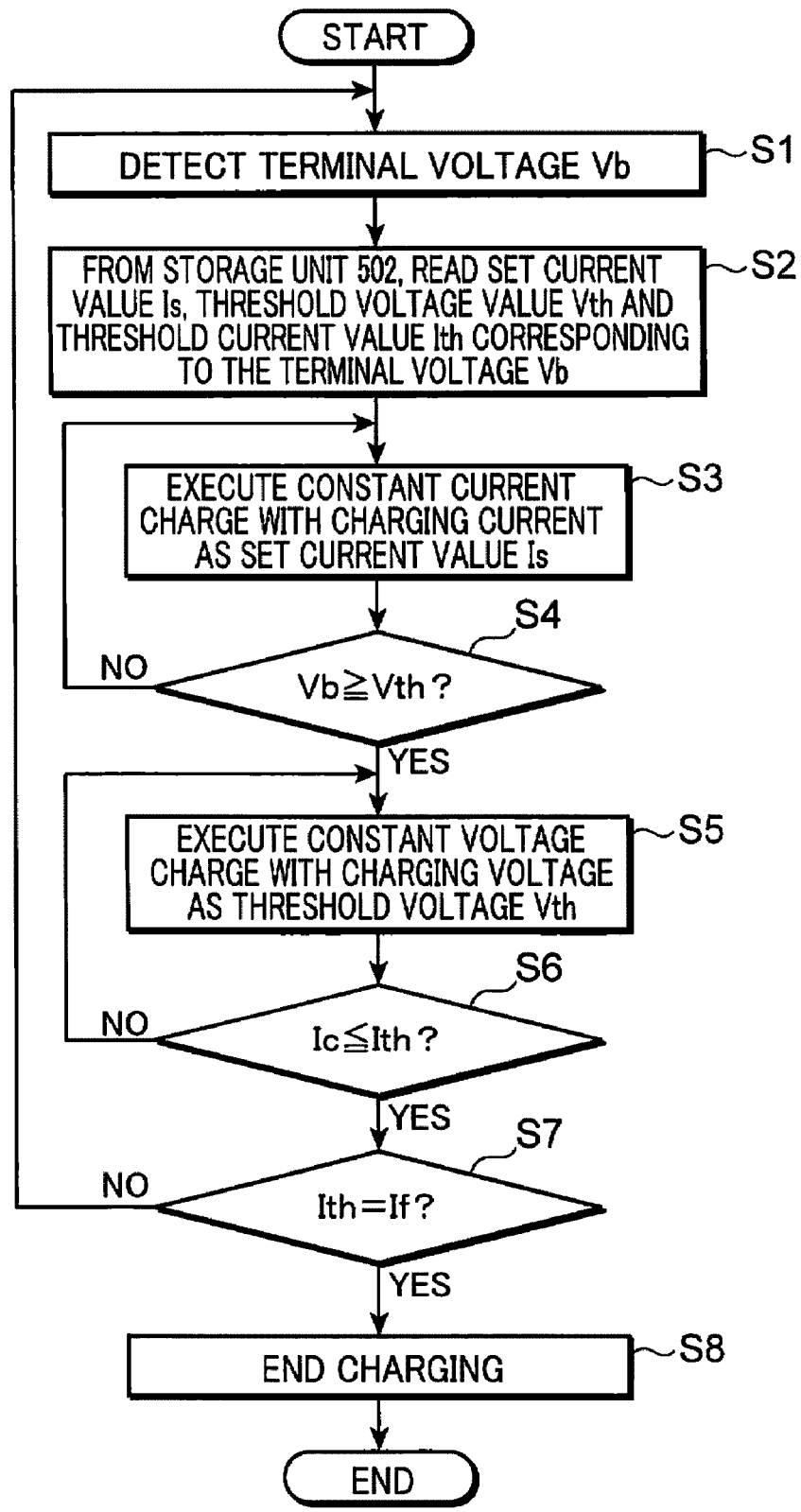
FIG. 3 is a flowchart showing an example of operations that are performed by a charge controller shown in FIG. 1.
Figure 4:
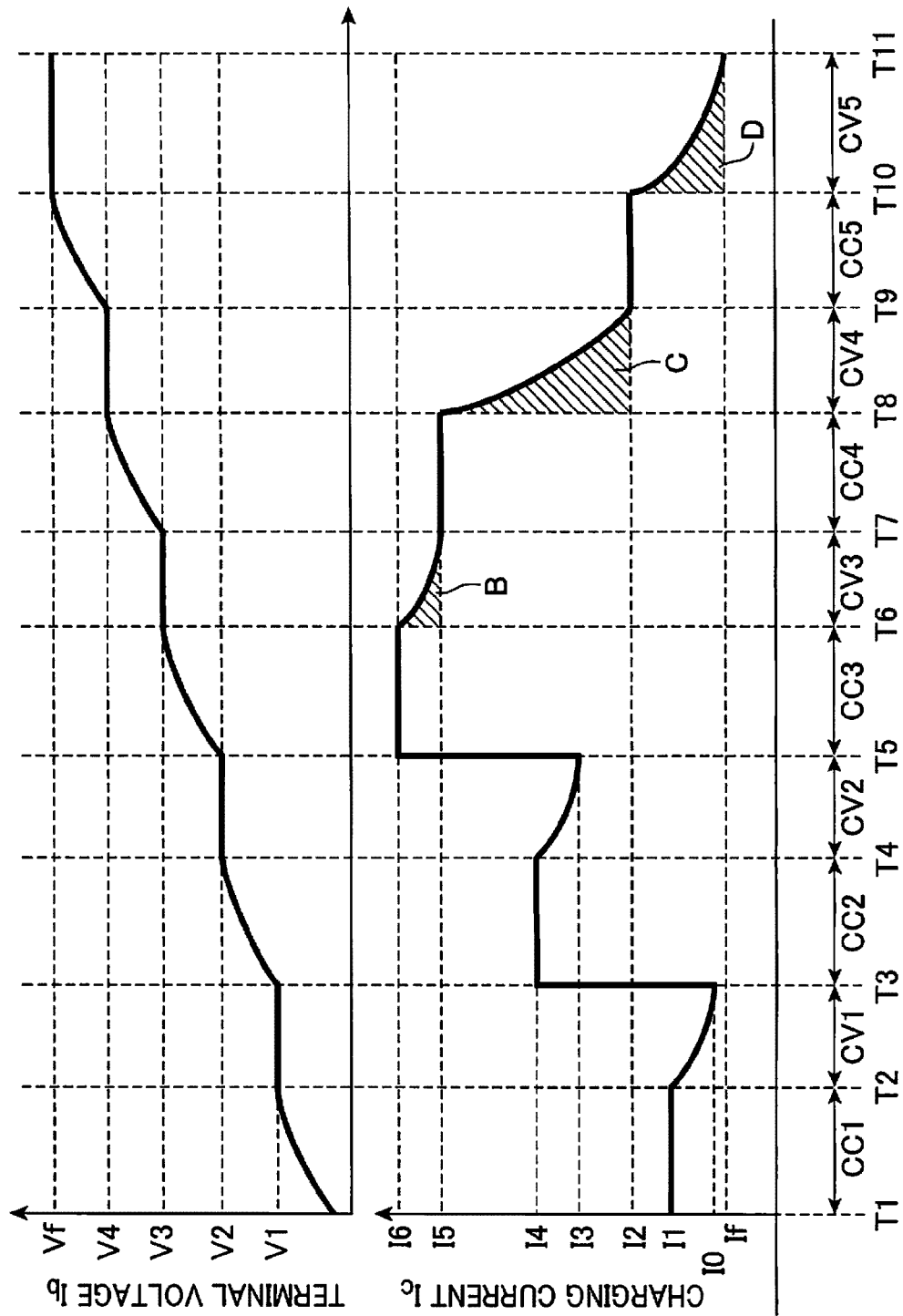
FIG. 4 is an explanatory diagram for illustrating an example of operations that are performed by a charging system shown in FIG. 1.

Next are described operations that are performed by charging system 1 having the abovementioned configuration. FIG. 3 is a flowchart showing an example of the operations that are performed by the charge controller 501 shown in FIG. 1. FIG. 4 is an explanatory diagram for illustrating operations that are performed by the charging system 1 shown in FIG. 1.

First, the voltage detector 51 detects the terminal voltage Vb of the secondary battery 4 at, for example, timing T1 shown in FIG. 4 (step S1). Subsequently, from the data table A of the storage unit 502, the charge controller 501 reads the set current value Is, the threshold voltage value Vth and the threshold current value Ith corresponding to the terminal voltage Vb (step S2).

Because the terminal voltage Vb is lower than the voltage value V1 at the timing T1, the charge controller 501 sets the set current value Is to a current value I1, the threshold voltage value Vth to the voltage value V1, and the threshold current value Ith to the current value I0, starting from the stage 1 shown in the data table A. The charge controller 501 then transmits to the controller 37 the request instruction requesting for the charging current corresponding to the current value I1. Accordingly, the charging current corresponding to the current value I1 is supplied from the charger 35 to the secondary battery 4 in response to the control by the controller 37, whereby constant current charge CC1 is executed (step S3).

Consequently, the terminal voltage Vb increases as the secondary battery 4 is charged by the charging current corresponding to the current value I1. When the terminal voltage Vb is less than the threshold voltage value Vth (NO in step S4), the charge controller 501 repeats step S3 to continue with the constant current charge CC1.

When the terminal voltage Vb becomes equal to or greater than the threshold voltage value Vth (YES in step S4, at timing T2), the charge controller 501 proceeds to step S5. The charge controller 501 then transmits to the controller 37 the request instruction requesting for the charging voltage corresponding to the voltage value V1. Accordingly, the charging voltage corresponding to the voltage value V1 is supplied from the charger 35 to the secondary battery 4 in response to the control by the controller 37, whereby constant voltage charge CV1 is executed (step S5).

In the case in which internal short-circuit occurs in the secondary battery 4 at the timing T1, the terminal voltage Vb does not increase because the secondary battery 4 is not charged. Therefore, the constant current charge CC1 is continued. However, in this constant current charge CC1, the charging current value I1 is set at an extremely small current value so as not to break or damage the battery pack 2. Thus, even when internal short-circuit occurs in the secondary battery 4, the risk of breakdown or damage in the battery pack 2 can be reduced.

Subsequently, during the constant voltage charge CV1, the charging current value Ic detected by the current detector 52 gradually decreases as the secondary battery 4 is charged by the charging voltage corresponding to the voltage value V1. When, at this moment, the charging current value Ic exceeds the threshold current value Ith (NO in step S6), step S5 is repeated so as to continue with the constant voltage charge CV1. The constant current constant voltage charge is executed in steps S1 to S6 (at timings T1 to T3) in the manner described above.

When the charging current value Ic becomes equal to or lower than the threshold current value Ith (YES in step S6, at the timing T3), the charge controller 501 proceeds to step S7. The charge controller 501 then compares the threshold current value Ith with the current value If (step S7). In the timing T3, the threshold current value Ith is set at the current value I0 in place of the current value If (NO in step S7). Thus, the charge controller 501 proceeds to step S1 to repeat the subsequent constant current constant voltage charge again.

Next, when the voltage detector 51 detects the terminal voltage Vb in step S1 (at the timing T3), the terminal voltage Vb being equivalent to the voltage value V1, the charge controller 501 reads, from the data table A of the storage unit 502, the current value I4, the voltage value V2 and the current value I3 of the stage 2 that correspond to the terminal voltage Vb corresponding to the voltage value V1, as the set current value Is, the threshold voltage value Vth and the threshold current value Ith (step S2). In other words, the set current value Is, the threshold voltage value Vth and the threshold current value Ith become higher than those obtained in the previous stage 1.

The charge controller 501 then transmits to the controller 37 the request instruction requesting for the charging current corresponding to the current value I4. Subsequently, the charging current corresponding to the current value I4 is supplied from the charger 35 to the secondary battery 4 in response to the control by the controller 37, whereby constant current charge CC2 is executed (step S3).

Shifting from the constant current charge CC1 to the constant voltage charge CV1 means that the terminal voltage Vb of the secondary battery 4 has increased as a result of charging the secondary battery 4, and assumes that internal short-circuit does not occur in the secondary battery 4. Therefore, in the constant current charge CC2, the set current value Is may be increased to the current value I6, which is an upper limit of the charging current. In other words, the range of the terminal voltage Vb in the stage 3 may be set to V1≦Vb<V3 without providing the stage 2 in the data table A. In this case, because the charging current is increased, the charging time can be reduced.

However, increasing the charging current leads to an increase in the amount of heat generated by the secondary battery 4. For this reason, the set current value Is in the stage 2 is set at the current value I4, which is smaller than the current value I6, according to the need of thermal design, so that the amount of heat generated by the secondary battery 4 can be reduced.

Thereafter, steps S3 to S7 are repeated so as to execute the constant current charge CC2 and the constant voltage charge CV2. In other words, the constant current constant voltage charge is executed, and then the charge controller 501 proceeds to step Si again (at timing T5). Because the terminal voltage Vb is equivalent to the voltage value V2 at this moment (step S1), the charge controller 501 reads, from the data table A of the storage unit 502, the current value I6, the voltage value V3 and the current value I5 in the stage 3 that correspond to the terminal voltage Vb corresponding to the voltage value V2, as a new set current value Is, threshold voltage value Vth and threshold current value Ith (step S2). In other words, the set current value Is, the threshold voltage value Vth and the threshold current value Ith become higher than those obtained in the previous stage 2.

The charge controller 501 then executes steps S3 to S7 again with the set current value Is as the current value I6, the threshold voltage value Vth as the voltage value V3, and the threshold current value Ith as the current value I5, so as to execute, as the constant current constant voltage charge, constant current charge CC3 (at timings T5 to T6) where the charging current is taken as the current value I6 and constant voltage charge CV3 (at timings T6 to T7) where the charging voltage is taken as the voltage value V3.

When the charging current value Ic becomes equal to or lower than the threshold current value Ith (YES in step S6, at the timing T7) in the constant voltage charge CV3 (timings T6 to T7), the charge controller 501 proceeds to step S7.

Because the threshold current value Ith is set at the current value IS in place of the current value If at the timing T7 (NO in step S7), the charge controller 501 proceeds to step Si to repeat the subsequent constant current constant voltage charge again.

Because the terminal voltage Vb is now equivalent to the voltage value V3 (step S1), the charge controller 501 reads, from the data table A of the storage unit 502, the current value IS, the voltage value V4 and the current value I2 in the stage 4 that correspond to the terminal voltage Vb corresponding to the voltage value V3, as a new set current value Is, threshold voltage value Vth and threshold current value Ith (step S2). In other words, during the constant current constant voltage charge (constant current charge CC4 and constant voltage charge CV4), which is started when the terminal voltage Vb exceeds the determination voltage Vj, the threshold voltage value Vth becomes higher than that of the previous stage 3 and the set current value Is and the threshold current value Ith become lower than those of the previous stage 3.

Then, the charge controller 501 executes steps S3 to S7 again with the set current value Is as the current value I5, the threshold voltage value Vth as the voltage value V4, and the threshold current value Ith as the current value I2, so as to execute the constant current charge CC4 (at timings T7 and T8) where the charging current is taken as the current value I5 and the constant voltage charge CV4 (at timings T8 and T9) where the charging voltage is taken as the voltage value V4.

When the charging current value Ic becomes equal to or lower than the threshold current value Ith (YES in step S6, at the timing T9) during the constant voltage charge CV4 (at the timings T8 and T9), the charge controller 501 proceeds to step S7.

In the timing T9, the threshold current value Ith is set at the current value I2 in place of the current value If (NO in step S7). Thus, the charge controller 501 proceeds to step Si to repeat the subsequent constant current constant voltage charge again.

Because the terminal voltage Vb is now equivalent to the voltage value V4 (step S1), the charge controller 501 reads, from the data table A of the storage unit 502, the current value I2, the voltage value Vf and the current value If in the stage 5 that correspond to the terminal voltage Vb corresponding to the voltage value V4, as a new set current value Is, threshold voltage value Vth and threshold current value Ith (step S2). In other words, the threshold voltage value Vth becomes higher than that of the previous stage 4 and the set current value Is and the threshold current value Ith become lower than those of the previous stage 4.

Then, the charge controller 501 executes steps S3 to S7 again with the set current value Is as the current value I2, the threshold voltage value Vth as the voltage value Vf, and the threshold current value Ith as the current value If, so as to execute constant current charge CC5 (at timings T9 and T10) where the charging current is taken as the current value I2 and constant voltage charge CV5 (at timings T10 and T11) where the charging voltage is taken as the voltage value Vf.

When the charging current value Ic becomes equal to or lower than the threshold current value Ith (YES in step S6, at the timing T11) during the constant voltage charge CV5 (at the timings T10 and T11), the charge controller 501 proceeds to step S7.

Because the threshold current value Ith is equal to the current value If in the timing T11 (YES in step S7), the charge controller 501 transmits to the controller 37 the request instruction requesting to set the charging current to 0, and accordingly the charger 35 stops the supply of the charging current in response to the control by the controller 37 (step S8), whereby the charging of the secondary battery 4 is ended.

Thereafter, in the constant current constant voltage charge (at the timings T5 to T11), which is started when the terminal voltage Vb detected by the voltage detector 51 exceeds the determination voltage Vj, the charge controller 501 refers to the data table A to fully charge the secondary battery 4 by repeating the constant current constant voltage charge a plurality of times while gradually increasing the threshold voltage value Vth to the full charge voltage Vf of the secondary battery 4 and gradually reducing the threshold current value Ith to the determination current value If used for determining to fully charge the secondary battery 4.

As a result, the multi-stage constant current charge is executed in which the charging current is gradually reduced with multiple stages in the constant current charge CC3, CC4 and CC5. This can achieve the advantages of the multi-stage constant current charge that hardly cause the degradation of the secondary battery 4. In addition, unlike the pulse charging system in which a voltage exceeding the full charge voltage is applied intentionally to the secondary battery, the multi-stage constant current charge can lower the risk of degrading the secondary battery 4.

Moreover, during the constant voltage charge CV3, CV4 and CV5, the charging current value Ic of the secondary battery 4 gradually decreases as the secondary battery 4 is charged by the charging voltage corresponding to the threshold voltage value Vth.

When the multi-stage constant current charging system described in the paragraph of background art is used here, constant current charge is executed with a current value that is lower by one stage, subsequent to the constant current charge CC3, CC4 and CC5, in place of the constant voltage charge CV3, CV4 and CV5. Consequently, the charge control circuit 5 shown in FIG. 1 can charge the secondary battery 4 more than the multi-stage constant current charging system described in the paragraph of background art, by a charge amount equivalent to the dimensions of shaded areas B, C and D shown in FIG. 4. Therefore, the charging time can be reduced more easily than the multi-stage constant current charging system.

Furthermore, according to the multi-stage constant current charging system described in the background art, when the terminal voltage of the secondary battery becomes equal to or greater than the predetermined threshold value during the constant current charge in a certain stage, the charging current is reduced by one stage so as to execute the constant current charge in the obtained subsequent stage. In such a circumstance, during a control response time between the detection of the terminal voltage equal to or greater than the threshold value and the decrease of the charging current value, the terminal voltage exceeds the threshold voltage, leading to the degradation of the secondary battery.

On the other hand, the charge control circuit 5 shown in FIG. 1 makes a shift from constant current charge to constant voltage charge in which the charging voltage is equivalent to the threshold voltage value Vth, when the terminal voltage Vb of the secondary battery 4 becomes equal to or greater than the threshold voltage value Vth during the constant current charge in a certain stage. Therefore, after the constant current charge is performed, voltage control is carried out in order to directly control the terminal voltage (charging voltage) of the secondary battery. This voltage control can easily prevent the terminal voltage Vb of the secondary battery 4 from exceeding the threshold voltage value Vth.

Moreover, in the constant current constant voltage charge that is started when the terminal voltage Vb exceeds the determination voltage Vj, the threshold current value Ith is used as the set current value Is in the subsequently repeated constant current constant voltage charge, based on the data table A. As a result, the values of the charging current and the charging voltage become consecutive so that shifting from the constant voltage charge CV3 to the constant current charge CC4 and from the constant voltage charge CV4 to the constant current charge CC5 can be performed smoothly, reducing stress on the secondary battery 4.

An example of increasing the set current value Is in two stages at the timings T1 to T5 was described, but the set current value Is may be changed to the maximum current value I6 in a single stage, or the set current value Is may be changed to the current value I6 in three or more stages.

An example of reducing the set current value Is to the current value If in the stages 3 to 5 at the timings T5 to T11 was described above, but the set current value Is may be reduced in two stages or in four or more stages.

Figure 5:
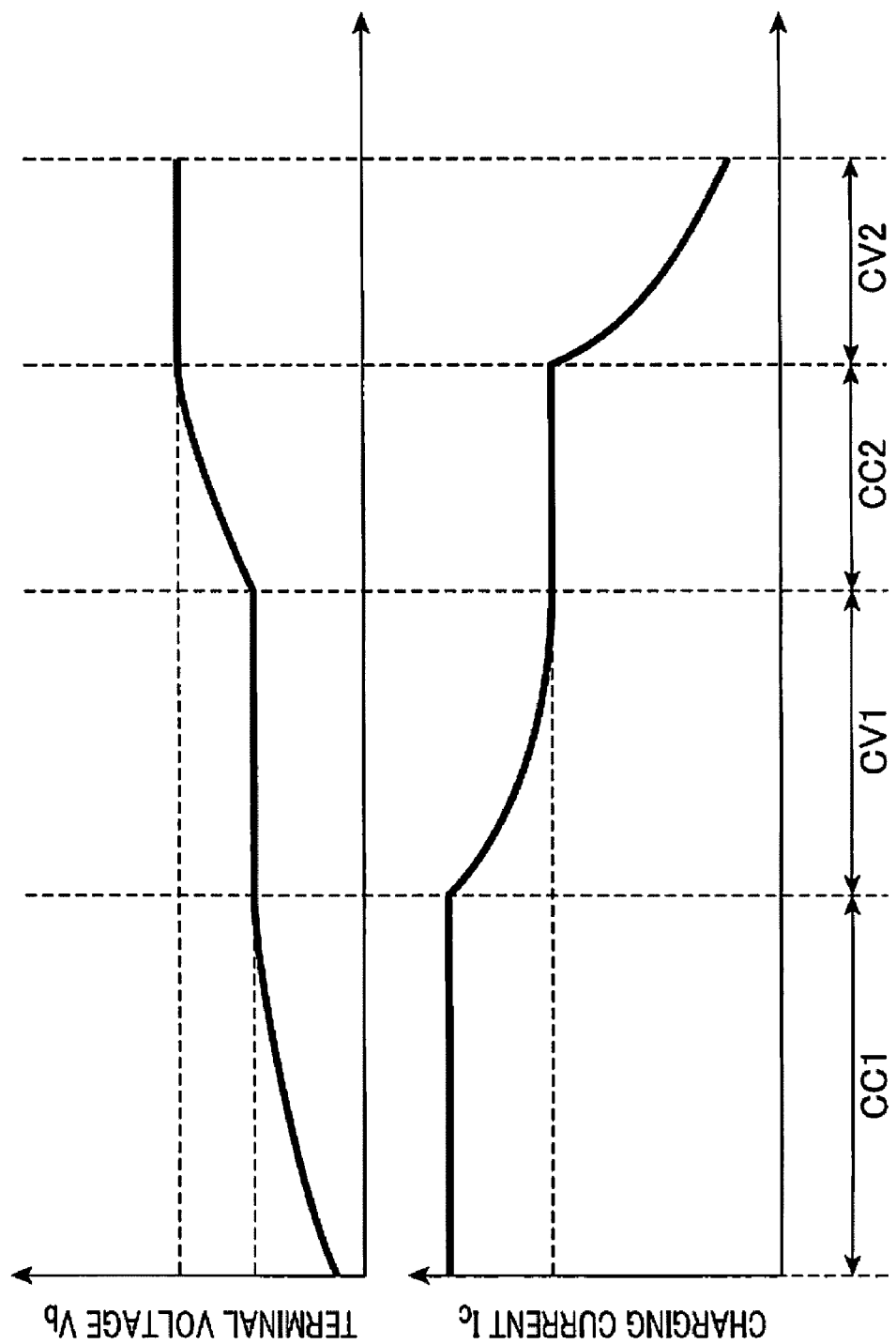
FIG. 5 is an explanatory diagram for illustrating another example of the operations that are performed by the charging system shown in FIG. 1.

A configuration in which there are no stages for increasing the set current value Is (charging current) may be adopted, as shown in FIG. 5.

Specifically, a charge control circuit according to one aspect of the present invention has: a charge controller for controlling an operation of a charger that charges a secondary battery; a voltage detector for detecting a terminal voltage of the secondary battery; and a current detector for detecting a current flowing to the secondary battery, wherein the charge controller repeats a plurality of times constant current constant-voltage charge in which the charge controller supplies a charging current having a predetermined set current value from the charger to the secondary battery to cause the charger to execute constant current charge and, when the terminal voltage detected by the voltage detector becomes equal to a predetermined threshold voltage value during the execution of the constant current charge, causes the charger to execute constant voltage charge by supplying a charging voltage having the threshold voltage value from the charger to the secondary battery until a current value detected by the current detector becomes equal to a predetermined threshold current value, and increases the threshold voltage value and reduces the set current value and the threshold current value each time the constant current constant voltage charge is repeated.

According to this configuration, the charge controller executes the constant current charge with the set current value. When the terminal voltage of the secondary battery increases to the threshold voltage value, the charge controller executes constant voltage charge with the charging voltage as the threshold voltage value until the current value of a current flowing to the secondary battery decreases to the threshold current value. The charge controller then repeats a plurality of times the constant current constant voltage charge, which is a set of the constant current charge and the constant voltage charge, while stepwise increasing the threshold voltage value to the full charge voltage for the secondary battery and stepwise reducing the set current value and the threshold current value.

Because the constant current charge is executed repeatedly, while stepwise reducing the charging current, the degradation of the secondary battery can be prevented, as with the multi-stage constant current charge according to the background art. In addition, unlike the pulse charging system, a voltage exceeding the full charge voltage is not applied intentionally to the secondary battery, thus preventing the degradation of the secondary battery more effectively than the pulse charging system. Furthermore, the constant voltage charge is executed subsequent to the constant current charge, and the charging current gradually decreases during the period of time in which the constant voltage charge is executed. As a result, compared to the conventional multi-stage constant current charge that reduces the charging current by one stage at once after the constant current charge, the charge amount increases more, and consequently the charging time is reduced more easily than the multi-stage constant current charging system according to the background art.

It is preferred that the charge controller use the threshold current value used in the constant current constant voltage charge, as the set current value for constant current constant voltage charge that is repeated subsequent thereto. Particularly, in the regions of battery voltages in which the charging current for the secondary battery needs to be stepwise reduced, the charge controller preferably uses the threshold current value used in the constant current constant voltage charge, as the set current value for constant current constant voltage charge that is repeated subsequent thereto.

According to this configuration, the current that flows to the secondary battery at the end of the constant voltage charge of the constant current constant voltage charge performed in the previous stage becomes the charging current that is used in the constant current charge of the constant current constant voltage charge performed in the subsequent stage. Thus, the charging current, which is obtained as a result of the shifting the constant current constant voltage charge from one stage to the other, changes continuously and smoothly, reducing the stress on the secondary battery.

Also, in constant current constant voltage charge, which is repeated subsequent to constant current constant voltage charge that is started when the terminal voltage detected by the voltage detector is less than a predefined determination voltage, it is preferred that the charge controller make the set current value, the threshold voltage value and the threshold current value higher than those obtained in previous constant current constant voltage charge.

According to this configuration, in the constant current constant voltage charge, which is repeated subsequent to the constant current constant voltage charge that is started when the terminal voltage of the secondary battery is less than the determination voltage, the set current value, the threshold voltage value and the threshold current value are made higher than those obtained in the previous constant current constant voltage charge. In other words, in the constant current constant voltage charge that is started when the terminal voltage of the secondary battery is less than the determination voltage, the set current value, the threshold voltage value and the threshold current value are set at smaller values, compared to the same values set in the constant current constant voltage charge that is executed subsequent to the abovementioned constant current constant voltage charge.

When the set current value and the threshold current value are stepwise reduced regardless of the value of the terminal voltage of the secondary battery, the set current value that is obtained immediately after the charging is started, or, in other words, the charge current value, becomes the largest current value. Therefore, if internal short-circuit occurs in the secondary battery, a current corresponding to the largest charging current value is supplied to the secondary battery with internal short-circuit immediately after the charging is started, leading to breakdown or damage in the charge control circuit.

However, in the case in which internal short-circuit occurs in the secondary battery, the terminal voltage of the secondary battery is considered to decrease below the determination voltage. Thus, in the constant current constant voltage charge that is started when the terminal voltage of the secondary battery is less than the determination voltage, the set current value, the threshold voltage value and the threshold current value are set at smaller values, compared to the constant current constant voltage charge that is executed subsequent to the abovementioned constant current constant voltage charge. As a result, the value of the charging current supplied to the secondary battery where internal short-circuit might be occurring can be reduced, lowering the risk of breakdown or damage in the charge control circuit.

It is preferred that the charge controller use the threshold current value, which is used in constant current constant voltage charge that is started when the terminal voltage detected by the voltage detector exceeds the determination voltage, as the set current value that is used in constant current constant voltage charge that is repeated subsequent thereto.

According to this configuration, in the constant voltage charge of the constant current constant voltage charge, which is started when the terminal voltage of the secondary battery exceeds the determination voltage and when the secondary battery is not considered to have internal-short circuit, the current that flows to the secondary battery at the end of this constant voltage charge becomes the charging current used in the constant current charge of the constant current constant voltage charge in the subsequent stage. Thus, the charging current, which is obtained as a result of the shifting the constant current constant voltage charge from one stage to the other, changes continuously and smoothly, reducing the stress on the secondary battery.

The charge control circuit further has a storage unit, which stores beforehand the set current value, the threshold voltage value and the threshold current value in relation to the terminal voltage, the set current value, the threshold voltage value and the threshold current value being used in each of the constant current constant voltage charge. The charge controller preferably uses, in each of the constant current constant voltage charge, the set current value and the threshold voltage value that are stored in the storage unit in relation to the terminal voltage detected by the voltage detector when starting each of the constant current constant voltage charge.

According to this configuration, the storage unit stores therein a plurality of the set current values and the threshold voltage values that are used in the constant current constant voltage charge, in association with the terminal voltage of the secondary battery, the constant current constant voltage charge being performed a plurality of times. When starting the constant current constant voltage charge, the charge controller uses the set current values and the threshold voltage values in this constant current constant voltage charge, the set current values and the threshold voltage values being stored in the storage unit in association with the terminal voltage detected by the voltage detector. In this case, the charge controller can experimentally obtain a combination of the set current value and the threshold voltage value (charging voltage) that allows an execution of excellent charging in accordance with the terminal voltage of the secondary battery, instead of carrying out the arithmetic calculation such as subtracting or adding a fixed value in order to reduce the set current value and increase the threshold voltage value, and then store the obtained combination in the storage unit. By using the set current value and the threshold voltage value stored in the storage unit, the charge controller can easily execute the excellent charging in accordance with the terminal voltage of the secondary battery.

A battery pack according to one aspect of the present invention has: the charge control circuit described above; and the secondary battery.

According to this configuration, the degradation of the secondary battery can be prevented in the battery pack more effectively than the pulse charging system, and the charging time can be reduced more easily than the multi-stage constant current charging system according to the background art.

A charging system according to one aspect of the present invention has: the charge control circuit described above; the secondary battery; and the charger.

According to this configuration, the degradation of the secondary battery can be prevented in the battery pack more effectively than the pulse charging system, and the charging time can be reduced more easily than the multi-stage constant current charging system according to the background art.

The charge control circuit, the battery pack and the charging system, which are configured as described above, repeatedly executes the constant current charge while gradually reducing the charging current, thus preventing the degradation of the secondary battery, as with the multi-stage constant current charge according to the background art. In addition, unlike the pulse charging system, a voltage exceeding the full charge voltage is not applied intentionally to the secondary battery, thus preventing the degradation of the secondary battery more effectively than the pulse charging system. Furthermore, the constant voltage charge is executed subsequent to the constant current charge, and the charging current gradually decreases during the period of time in which the constant voltage charge is executed. As a result, compared to the conventional multi-stage constant current charge that reduces the charging current by one stage at once after the constant current charge, the charge amount increases more, and consequently the charging time is reduced more easily than the multi-stage constant current charging system according to the background art.

This application is based on Japanese Patent Application No. 2009-264700, filed on Nov. 20, 2009, the contents of which are incorporated herein.

Specific embodiments or examples presented in the chapter of best mode for carrying out the invention are used for the sake of clarification of the technical contents of the present invention and should not be interpreted as limiting the scope of the present invention. Therefore, various modifications can be made within the spirit of the present invention and the scope of claims described hereinafter.

INDUSTRIAL APPLICABILITY

The charge control circuit according to the present invention, as well as the battery pack and the charging system that have this charge control circuit, can be suitably used in electronic devices such as portable personal computers, digital cameras and mobile phones, vehicles such as electric vehicles and hybrid cars, power systems having a combination of a solar battery or generator and a secondary battery, and various other battery-equipped devices and systems.

The invention claimed is:

1. A charge control circuit, comprising:
a charge controller for controlling an operation of a charger that charges a secondary battery;
a voltage detector for detecting a terminal voltage of the secondary battery; and
a current detector for detecting a current flowing to the secondary battery,
wherein the charge controller repeats a plurality of times constant current constant voltage charge in which the charge controller supplies a charging current having a predetermined set current value from the charger to the secondary battery to cause the charger to execute constant current charge, and, when the terminal voltage detected by the voltage detector becomes equal to a predetermined threshold voltage value during the execution of the constant current charge, causes the charger to execute constant voltage charge by supplying a charging voltage having the threshold voltage value from the charger to the secondary battery until a current value detected by the current detector becomes equal to a predetermined threshold current value, and increases the threshold voltage value and reduces the set current value and the threshold current value each time the constant current constant voltage charge is repeated,
wherein in constant current constant voltage charge, which is repeated subsequent to constant current constant voltage charge that is started when the terminal voltage detected by the voltage detector is less than a predefined determination voltage, the charge controller makes the set current value, the threshold voltage value and the threshold current value higher than those obtained in previous constant current constant voltage charge.

2. The charge control circuit according to claim 1, wherein the charge controller uses the threshold current value used in the constant current constant voltage charge, as the set current value for constant current constant voltage charge that is repeated subsequent thereto.

3. The charge control circuit according to claim 1, wherein the charge controller uses the threshold current value, which is used in constant current constant voltage charge that is started when the terminal voltage detected by the voltage detector exceeds the determination voltage, as the set current value that is used in constant current constant voltage charge that is repeated subsequent thereto.

4. A battery pack, comprising:
the charge control circuit according to claim 1; and
the secondary battery.

5. A charging system, comprising:
the charge control circuit according to claim 1;
the secondary battery; and the charger.

6. A charge control circuit comprising:
a charge controller for controlling an operation of a charger that charges a secondary battery;
a voltage detector for detecting a terminal voltage of the secondary battery;
a current detector for detecting a current flowing to the secondary battery; and
a storage unit, which stores beforehand the set current value, the threshold voltage value and the threshold current value in relation to the terminal voltage, the set current value, the threshold voltage value and the threshold current value being used in each of the constant current constant voltage charge,
wherein the charge controller repeats a plurality of times constant current constant voltage charge in which the charge controller supplies a charging current having a predetermined set current value from the charger to the secondary battery to cause the charger to execute constant current charge, and, when the terminal voltage detected by the voltage detector becomes equal to a redetermined threshold voltage value during the execution of the constant current charge, causes the charger to execute constant voltage charge by supplying a charging voltage having the threshold voltage value from the charger to the secondary battery until a current value detected by the current detector becomes equal to a predetermined threshold current value, and increases the threshold voltage value and reduces the set current value and the threshold current value each time the constant current constant voltage charge is repeated,
and wherein the charge controller uses, in each of the constant current constant voltage charge, the set current value and the threshold voltage value that are stored in the storage unit in relation to the terminal voltage detected by the voltage detector when starting each of the constant current constant voltage charge.

* * * * *